US012169381B2

(12) United States Patent
Amann et al.

(10) Patent No.: US 12,169,381 B2
(45) **Date of Patent: *Dec. 17, 2024**

(54) TONER CARTRIDGE ELECTRICAL CONTACTS

(71) Applicant: LEXMARK INTERNATIONAL, INC., Lexington, KY (US)

(72) Inventors: Mark William Amann, Lexington, KY (US); Brian Lester Boettcher, Versailles, KY (US); James Anthany Carter, II, Lexington, KY (US); Benjamin Charles Devore, Lexington, KY (US); Darin Michael Gettelfinger, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,363

(22) Filed: Jun. 15, 2023

(65) Prior Publication Data

US 2023/0324842 A1 Oct. 12, 2023

Related U.S. Application Data

(63) Continuation of application No. 17/140,204, filed on Jan. 4, 2021, now Pat. No. 11,714,373, which is a (Continued)

(51) Int. Cl.

| | |
|---|---|
| ***G03G 15/00*** | (2006.01) |
| ***G03G 15/08*** | (2006.01) |
| ***G03G 21/16*** | (2006.01) |

(52) U.S. Cl.

CPC ......... *G03G 15/80* (2013.01); *G03G 15/0867* (2013.01); *G03G 21/1652* (2013.01)

(58) Field of Classification Search

CPC . G03G 15/80; G03G 15/0867; G03G 21/1652

See application file for complete search history.

(56) References Cited

U.S. PATENT DOCUMENTS

| | | | | |
|---|---|---|---|---|
| 9,429,902 | B2 | 8/2016 | Kim et al. | |
| 10,725,422 | B2 * | 7/2020 | Amann | G03G 15/80 |
| 2008/0159774 | A1 | 7/2008 | Tanabe et al. | |

OTHER PUBLICATIONS

English Translation of Office Action dated Sep. 12, 2023 for China Patent Application No. 2019800692605.

(Continued)

*Primary Examiner* — Stephanie E Bloss
*Assistant Examiner* — Michael A Harrison
(74) *Attorney, Agent, or Firm* — Justin M. Tromp

(57) ABSTRACT

A toner cartridge according to one example embodiment includes a housing having a reservoir for holding toner. A first electrical contact and a second electrical contact are positioned on a first longitudinal end of the housing. The first electrical contact is electrically connected to processing circuitry positioned on the housing. The second electrical contact is electrically connected to an imaging component positioned on the housing. The first electrical contact is positioned higher than the second electrical contact. A first drive coupler and a second drive coupler are positioned on a second longitudinal end of the housing. The first electrical contact and the second electrical contact are positioned higher than a first rotational axis of the first drive coupler. The first electrical contact is positioned higher than a second rotational axis of the second drive coupler and the second electrical contact is positioned lower than the second rotational axis.

18 Claims, 12 Drawing Sheets

Related U.S. Application Data continuation of application No. 16/902,879, filed on Jun. 16, 2020, now Pat. No. 10,908,551, which is a continuation of application No. 16/170,564, filed on Oct. 25, 2018, now Pat. No. 10,725,422.

(56) References Cited

OTHER PUBLICATIONS

English Translation of Office Action dated Jan. 25, 2024 for China Patent Application No. 2019800692605.

English Translation of Office Action dated Apr. 24, 2024 for Brazilian Patent Application No. BR112021007722-7.

* cited by examiner

TONER CARTRIDGE ELECTRICAL CONTACTS

CROSS REFERENCES TO RELATED APPLICATIONS

This application is a continuation application of U.S. patent application Ser. No. 17/140,204, filed Jan. 4, 2021, entitled "Toner Cartridge Electrical Contacts," which is a continuation application of U.S. patent application Ser. No. 16/902,879, filed Jun. 16, 2020, now U.S. Pat. No. 10,908, 551, issued Feb. 2, 2021, entitled "Toner Cartridge Electrical Contacts," which is a continuation application of U.S. patent application Ser. No. 16/170,564, filed Oct. 25, 2018, now U.S. Pat. No. 10,725,422, issued Jul. 28, 2020, entitled "Toner Cartridge Electrical Contacts."

BACKGROUND

1. Field of the Disclosure

The present disclosure relates generally to image forming devices and more particularly to toner cartridge electrical contacts.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable toner containers that have a shorter lifespan than the image forming device. Each toner container may require various electrical connections to the image forming device upon installation of the toner container in the image forming device. For example, the toner container(s) may include imaging components, such as a photoconductive drum, a charge roll, a developer roll, a toner adder roll, etc., that are electrically charged to a specified voltage by a power supply in the image forming device when the toner container is installed in the image forming device in order to electrostatically move toner from one component to another. The toner container(s) may include one or more electrical contacts that mate with corresponding electrical contacts in the image forming device upon installation of the toner container in the image forming device in order to provide an electrical connection between the power supply of the image forming device and the imaging components of the toner container.

It may also be desired to communicate various characteristics of the toner container(s) to the image forming device for proper operation. For example, it may be desired to communicate such information as toner container serial number, toner container type, toner color, toner capacity, amount of toner remaining, license information, etc. The toner container(s) typically include processing circuitry configured to communicate with and respond to commands from a controller in the image forming device. The toner container(s) also include memory associated with the processing circuitry that stores program instructions and information related to the toner container. The processing circuitry and associated memory are typically mounted on a circuit board that is attached to the toner container. The toner container(s) include one or more electrical contacts that mate with corresponding electrical contacts in the image forming device upon installation of the toner container in the image forming device in order to facilitate communication between the processing circuitry of the toner container and the controller of the image forming device.

It is important for the electrical contacts of the toner container(s) to consistently and reliably contact the corresponding electrical contacts in the image forming device upon installation of the toner container in the image forming device in order to ensure a reliable electrical connection for proper operation.

SUMMARY

A toner cartridge according to one example embodiment includes a housing having a top, a bottom, a first side and a second side positioned between a first longitudinal end and a second longitudinal end of the housing. The housing has a reservoir for holding toner. A first electrical contact and a second electrical contact are positioned on the first longitudinal end of the housing for contacting a first corresponding electrical contact in the image forming device and a second corresponding electrical contact in the image forming device when the toner cartridge is installed in the image forming device. The first electrical contact of the toner cartridge is electrically connected to processing circuitry positioned on the housing. The second electrical contact of the toner cartridge is electrically connected to an imaging component positioned on the housing. The first electrical contact of the toner cartridge is positioned higher than the second electrical contact of the toner cartridge. A first drive coupler and a second drive coupler are positioned on the second longitudinal end of the housing for mating with a first corresponding drive coupler in the image forming device and a second corresponding drive coupler in the image forming device for receiving rotational motion from the first corresponding drive coupler in the image forming device and the second corresponding drive coupler in the image forming device when the toner cartridge is installed in the image forming device. The first drive coupler of the toner cartridge has a first rotational axis and the second drive coupler of the toner cartridge has a second rotational axis. The first electrical contact of the toner cartridge and the second electrical contact of the toner cartridge are positioned higher than the first rotational axis. The first electrical contact of the toner cartridge is positioned higher than the second rotational axis and the second electrical contact of the toner cartridge is positioned lower than the second rotational axis.

Embodiments include those wherein the first electrical contact of the toner cartridge and the second electrical contact of the toner cartridge are unobstructed from below permitting the first corresponding electrical contact in the image forming device to contact the first electrical contact of the toner cartridge from below and the second corresponding electrical contact in the image forming device to contact the second electrical contact of the toner cartridge from below when the toner cartridge is installed in the image forming device.

Embodiments include those wherein the first electrical contact of the toner cartridge and the second electrical contact of the toner cartridge face primarily downward facilitating the first corresponding electrical contact in the image forming device to contact the first electrical contact of the toner cartridge from below and the second corresponding electrical contact in the image forming device to contact the second electrical contact of the toner cartridge from below when the toner cartridge is installed in the image forming device.

In some embodiments, the first electrical contact of the toner cartridge and the second electrical contact of the toner cartridge extend outward away from the first longitudinal end of the housing along a longitudinal dimension of the housing.

Embodiments include those wherein the first electrical contact of the toner cartridge includes a first set of electrical contacts of the toner cartridge and the second electrical contact of the toner cartridge includes a second set of electrical contacts of the toner cartridge. The first set of electrical contacts of the toner cartridge are spaced from each other along a lateral dimension of the housing that runs from the first side to the second side. The second set of electrical contacts of the toner cartridge are spaced from each other along the lateral dimension of the housing. The first set of electrical contacts of the toner cartridge are each electrically connected to the processing circuitry positioned on the housing. The second set of electrical contacts of the toner cartridge are each electrically connected to a respective imaging component positioned on the housing. In some embodiments, the first set of electrical contacts of the toner cartridge is positioned directly above the second set of electrical contacts of the toner cartridge. In some embodiments, the first set of electrical contacts of the toner cartridge overlaps with the second set of electrical contacts of the toner cartridge along the lateral dimension of the housing.

Embodiments include those wherein the first electrical contact of the toner cartridge is positioned adjacent to the top of the housing.

Embodiments include those wherein the first electrical contact of the toner cartridge and the second electrical contact of the toner cartridge are positioned closer to the first side of the housing than the second rotational axis is to the first side of the housing and the second rotational axis is positioned closer to the second side of the housing than to the first side of the housing.

In some embodiments, a first pocket is positioned directly below the first electrical contact of the toner cartridge and a second pocket is positioned directly below the second electrical contact of the toner cartridge permitting additional electrical contacts in the image forming device to pass directly below the first electrical contact of the toner cartridge and directly below the second electrical contact of the toner cartridge along a lateral dimension of the housing that runs from the first side to the second side during installation of the toner cartridge into the image forming device.

A toner cartridge according to another example embodiment includes a housing having a top, a bottom, a first side and a second side positioned between a first longitudinal end and a second longitudinal end of the housing. The housing has a reservoir for holding toner. A photoconductive drum is rotatably positioned on the housing. A portion of an outer surface of the photoconductive drum is exposed along the bottom of the housing. The photoconductive drum includes a first rotational axis. A first electrical contact and a second electrical contact are unobstructed from below on the first longitudinal end of the housing permitting a first corresponding electrical contact in the image forming device to contact the first electrical contact of the toner cartridge from below and a second corresponding electrical contact in the image forming device to contact the second electrical contact of the toner cartridge from below when the toner cartridge is installed in the image forming device. The first electrical contact of the toner cartridge is electrically connected to processing circuitry positioned on the housing. The second electrical contact of the toner cartridge is electrically connected to the photoconductive drum. The first electrical contact of the toner cartridge is positioned higher than the second electrical contact of the toner cartridge. A boss protrudes outward from the first longitudinal end of the housing at the first rotational axis. The second electrical contact of the toner cartridge is positioned higher than the boss.

A toner cartridge according to another example embodiment includes a housing having a top, a bottom, a first side and a second side positioned between a first longitudinal end and a second longitudinal end of the housing. The housing has a reservoir for holding toner. A photoconductive drum is rotatably positioned on the housing. A portion of an outer surface of the photoconductive drum is exposed along the bottom of the housing. The photoconductive drum includes a first rotational axis. A developer roll is rotatably positioned on the housing and is positioned to supply toner from the reservoir to the photoconductive drum. A first set of electrical contacts and a second set of electrical contacts are positioned on the first longitudinal end of the housing for contacting a first set of corresponding electrical contacts in the image forming device and a second set of corresponding electrical contacts in the image forming device when the toner cartridge is installed in the image forming device. The first set of electrical contacts of the toner cartridge are spaced from each other along a lateral dimension of the housing that runs from the first side to the second side. The second set of electrical contacts of the toner cartridge are spaced from each other along the lateral dimension of the housing. The first set of electrical contacts of the toner cartridge are each electrically connected to processing circuitry positioned on the housing. The second set of electrical contacts of the toner cartridge are each electrically connected to a respective imaging component positioned on the housing. The first set of electrical contacts of the toner cartridge is positioned higher than the second set of electrical contacts of the toner cartridge. A first drive coupler and a second drive coupler are positioned on the second longitudinal end of the housing for mating with a first corresponding drive coupler in the image forming device and a second corresponding drive coupler in the image forming device for receiving rotational motion from the first corresponding drive coupler in the image forming device and the second corresponding drive coupler in the image forming device when the toner cartridge is installed in the image forming device. The first drive coupler of the toner cartridge has a second rotational axis and is operatively connected to the photoconductive drum to transfer rotational motion to the photoconductive drum. The second drive coupler of the toner cartridge has a third rotational axis and is operatively connected to the developer roll to transfer rotational motion to the developer roll. The first set of electrical contacts of the toner cartridge and the second set of electrical contacts of the toner cartridge are positioned higher than the first rotational axis and the second rotational axis. The first set of electrical contacts of the toner cartridge is positioned higher than the third rotational axis and the second set of electrical contacts of the toner cartridge is positioned lower than the third rotational axis.

BRIEF DESCRIPTION OF THE DRAWINGS

The accompanying drawings incorporated in and forming a part of the specification illustrate several aspects of the present disclosure and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
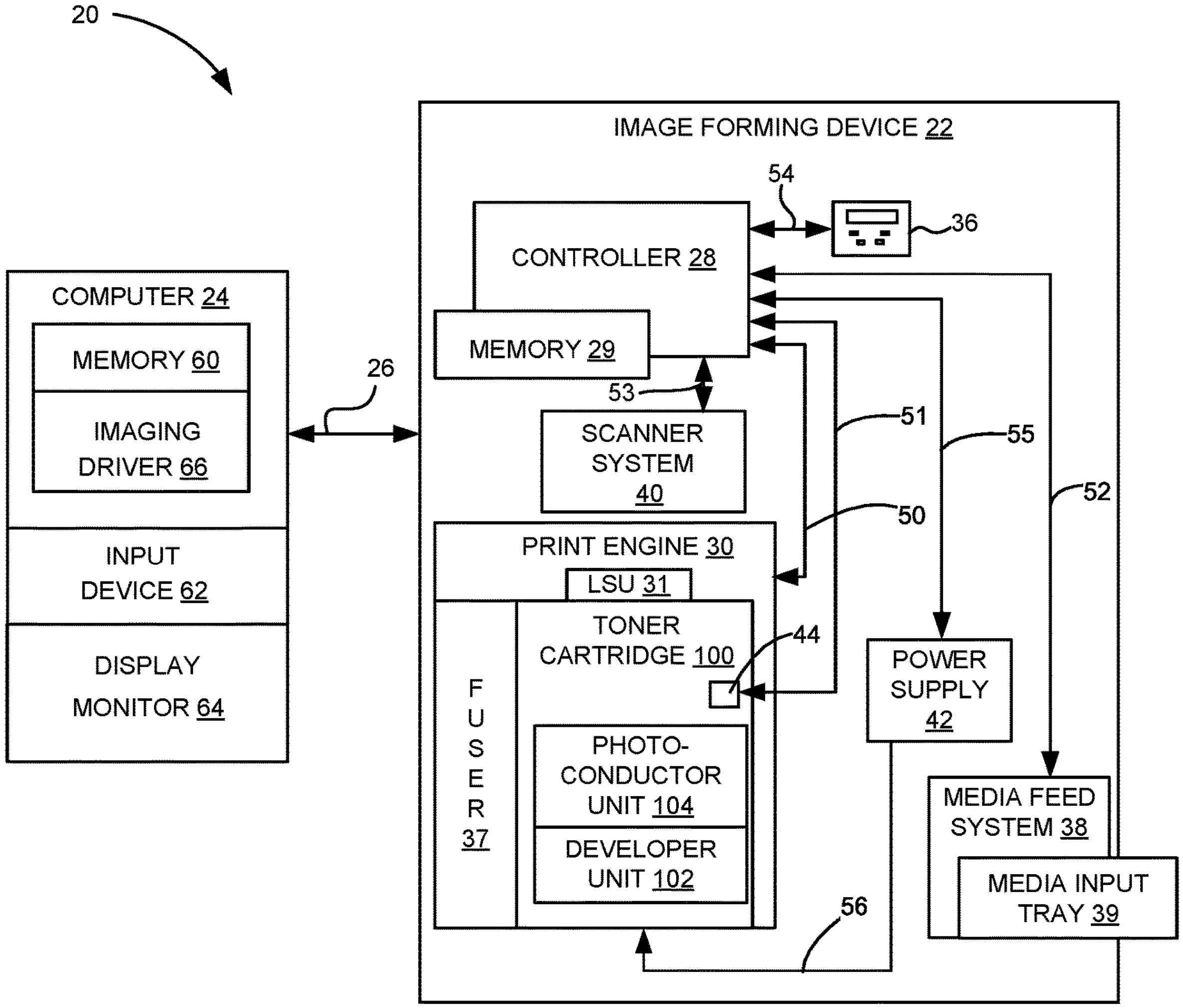
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, a toner cartridge 100, a user interface 36, a media feed system 38, a media input tray 39, a scanner system 40 and a power supply 42. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor unit may include one or more integrated circuits in the form of a microprocessor or central processing unit and may include one or more Application-Specific Integrated Circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with toner cartridge 100 and processing circuitry 44 thereon via a communications link 51. Controller 28 communicates with media feed system 38 via a communications link 52. Controller 28 communicates with scanner system 40 via a communications link 53. User interface 36 is communicatively coupled to controller 28 via a communications link 54. Controller 28 communicates with power supply 42 via a communications link 55. Controller 28 processes print and scan data and operates print engine 30 during printing and scanner system 40 during scanning. Processing circuitry 44 may provide authentication functions, safety and operational interlocks, operating parameters and usage information related to toner cartridge 100. Processing circuitry 44 includes a processor unit and associated electronic memory. As discussed above, the processor may include one or more integrated circuits in the form of a microprocessor or central processing unit and/or may include one or more Application-Specific Integrated Circuits (ASICs). The memory may be any volatile or non-volatile memory or combination thereof or any memory device convenient for use with processing circuitry 44.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes a laser scan unit (LSU) 31, toner cartridge 100 and a fuser 37, all mounted within image forming device 22. Toner cartridge 100 is removably mounted in image forming device 22. Power supply 42 provides an electrical voltage to various components of toner cartridge 100 via an electrical path 56. Toner cartridge 100 includes a developer unit 102 that houses a toner reservoir and a toner development system. In one embodiment, the toner development system utilizes what is commonly referred to as a single component development system. In this embodiment, the toner development system includes a toner adder roll that provides toner from the toner reservoir to a developer roll. A doctor blade provides a metered, uniform layer of toner on the surface of the developer roll. In another embodiment, the toner development system utilizes what is commonly referred to as a dual component development system. In this embodiment, toner in the toner reservoir of developer unit 102 is mixed with magnetic carrier beads. The magnetic carrier beads may be coated with a polymeric film to provide triboelectric properties to attract toner to the carrier beads as the toner and the magnetic carrier beads are mixed in the toner reservoir. In this embodiment, developer unit 102 includes a developer roll that attracts the magnetic carrier beads having toner thereon to the developer roll through the use of magnetic fields. Toner cartridge 100 also includes a photoconductor unit 104 that houses a charge roll, a photoconductive drum and a waste toner removal system. Although the example image forming device 22 illustrated in FIG. 1 includes one toner cartridge, in the case of an image forming device configured to print in color, separate toner cartridges may be used for each toner color. For example, in one embodiment, the image forming device includes four toner cartridges, each toner cartridge containing a particular toner color (e.g., black, cyan, yellow and magenta) to permit color printing.

Figure 2:
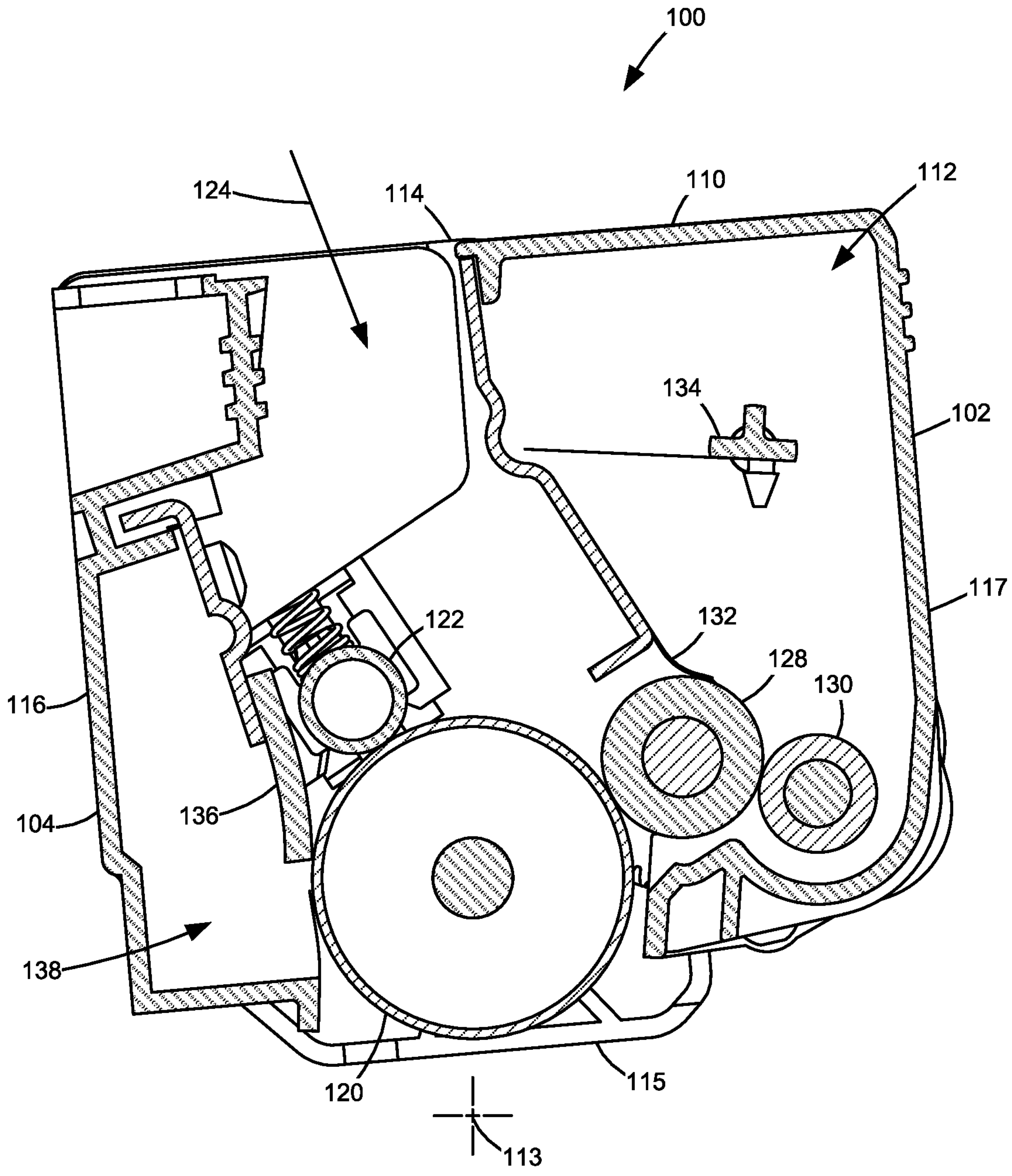
FIG. 2 is a cross-sectional view of a toner cartridge of the imaging system according to one example embodiment.

FIG. 2 shows toner cartridge 100 according to one example embodiment. Toner cartridge 100 includes an elongated housing 110 that includes walls forming a toner reservoir 112. In the example embodiment illustrated, housing 110 extends along a longitudinal dimension 113 and includes a top 114, a bottom 115, a first side 116 and a second side 117 that extend between longitudinal ends 118, 119 (FIGS. 3 and 4) of housing 110. In this embodiment, developer unit 102 is positioned along side 117 of housing 110 and photoconductor unit 104 is positioned along side 116 of housing 110.

The electrophotographic printing process is well known in the art and, therefore, is described briefly herein. During a print operation, a rotatable charge roll 122 of photoconductor unit 104 charges the surface of a rotatable photoconductive drum 120. The charged surface of photoconductive drum 120 is then selectively exposed to a laser light source 124 from LSU 31 through a slit 126 (FIGS. 3 and 4) in the top 114 of housing 110 to form an electrostatic latent image on photoconductive drum 120 corresponding to the image to be printed. Charged toner from developer unit 102 is picked up by the latent image on photoconductive drum 120 creating a toned image on the surface of photoconductive drum 120. Charge roll 122 and photoconductive drum 120 are each electrically charged to a respective predetermined voltage by power supply 42 in order to achieve a desired voltage differential between the charged portions of the surface of photoconductive drum 120 and the portions of the surface of photoconductive drum 120 discharged by laser light source 124.

Developer unit 102 includes toner reservoir 112 having toner particles stored therein and a rotatable developer roll 128 that supplies toner from toner reservoir 112 to photoconductive drum 120. In the example embodiment illustrated, a rotatable toner adder roll 130 in developer unit 102 supplies toner from toner reservoir 112 to developer roll 128. A doctor blade 132 disposed along developer roll 128 provides a substantially uniform layer of toner on developer roll 128 for transfer to photoconductive drum 120. As developer roll 128 and photoconductive drum 120 rotate, toner particles are electrostatically transferred from developer roll 128 to the latent image on photoconductive drum 120 forming a toned image on the surface of photoconductive drum 120. In one embodiment, developer roll 128 and photoconductive drum 120 rotate in opposite rotational directions such that their adjacent surfaces move in the same direction to facilitate the transfer of toner from developer roll 128 to photoconductive drum 120. One or more movable toner agitators 134 may be provided in toner reservoir 112 to distribute the toner therein and to break up any clumped toner. Developer roll 128 and toner adder roll 130 are each electrically charged to a respective predetermined voltage by power supply 42 in order to attract toner from reservoir 112 to toner adder roll 130 and to electrostatically transfer toner from toner adder roll 130 to developer roll 128 and from developer roll 128 to the latent image on the surface of photoconductive drum 120. Doctor blade 132 may also be electrically charged to a predetermined voltage by power supply 42 as desired.

The toned image is then transferred from photoconductive drum 120 to the print media (e.g., paper) either directly by photoconductive drum 120 or indirectly by an intermediate transfer member. In the example embodiment illustrated, the surface of photoconductive drum 120 is exposed along the bottom 115 of housing 110 where the toned image transfers from photoconductive drum 120 to the print media or intermediate transfer member. Fuser 37 (FIG. 1) then fuses the toner to the print media. A cleaner blade 136 (or cleaner roll) of photoconductor unit 104 removes any residual toner adhering to photoconductive drum 120 after the toner is transferred from photoconductive drum 120 to the print media or intermediate transfer member. Waste toner from cleaner blade 136 may be held in a waste toner reservoir 138 in photoconductor unit 104 as illustrated or moved to a separate waste toner container. The cleaned surface of photoconductive drum 120 is then ready to be charged again and exposed to laser light source 124 to continue the printing cycle.

Figure 3:
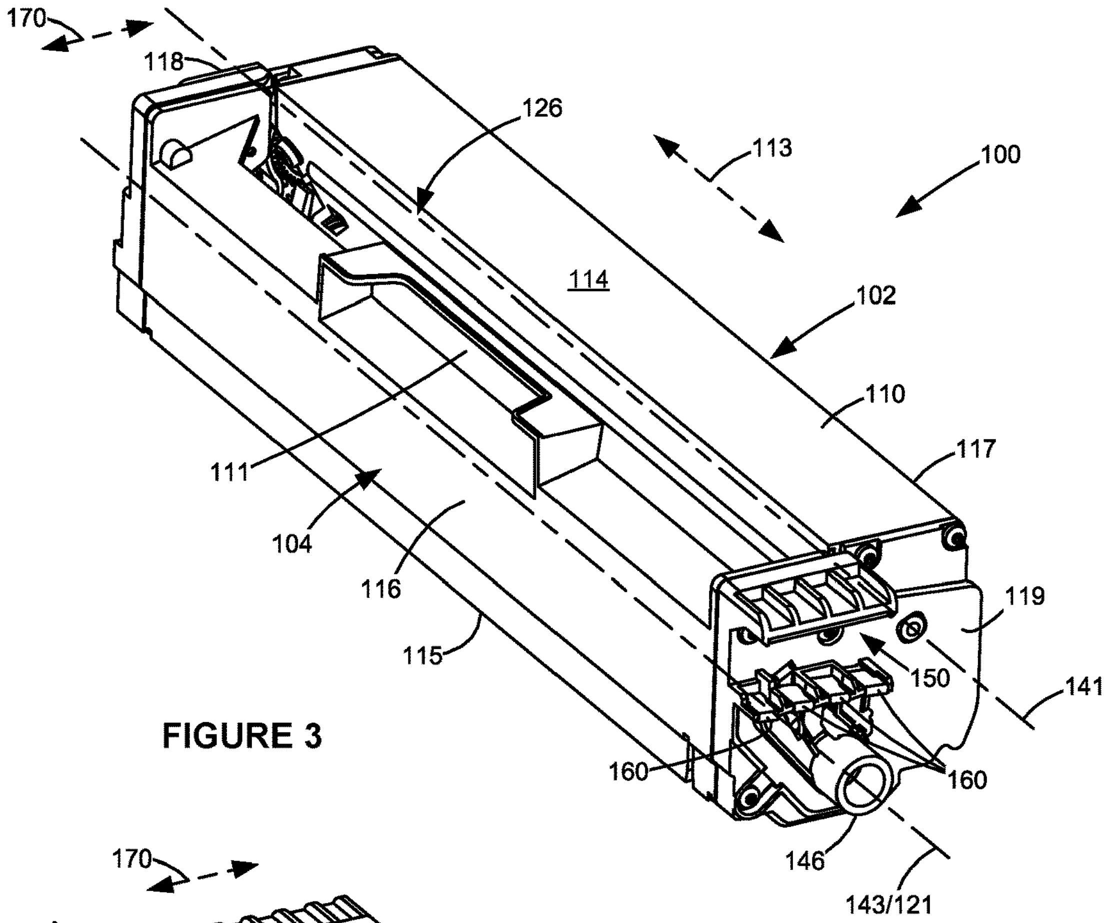
FIGS. 3 and 4 are perspective views of the toner cartridge according to one example embodiment.
Figure 4:
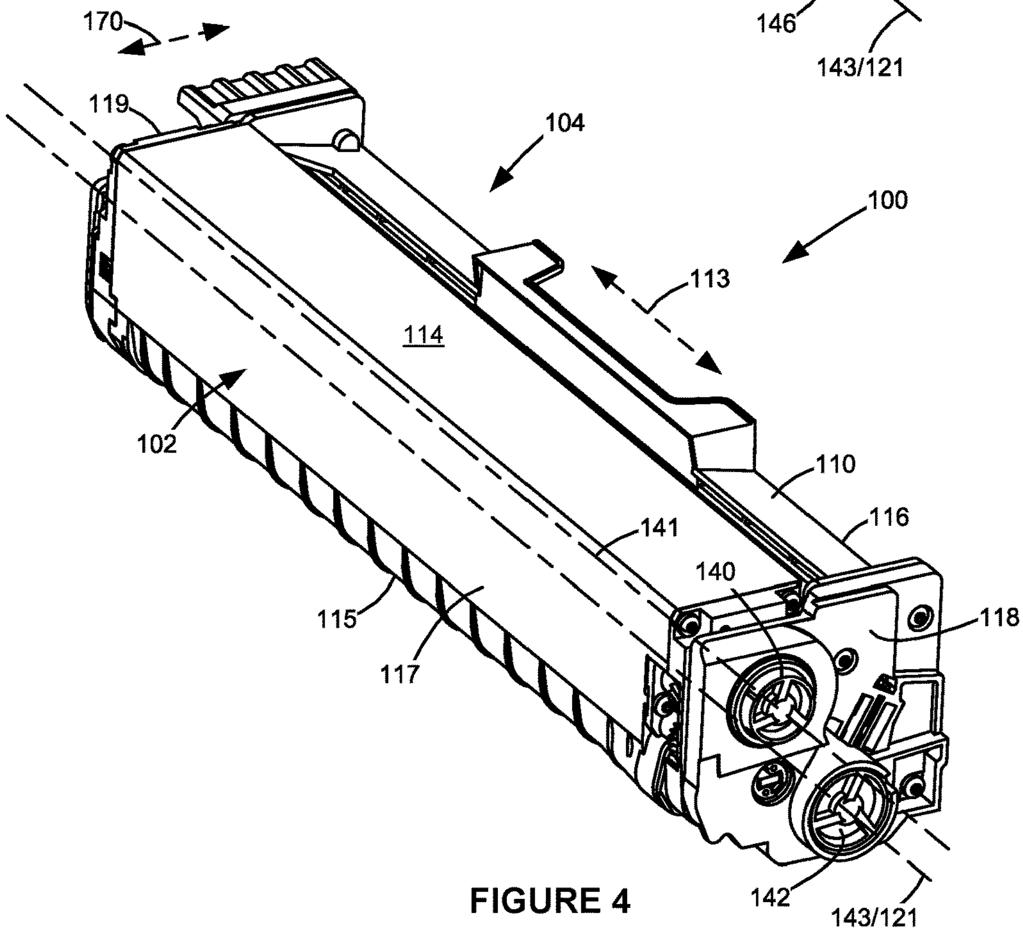
Figure 5:
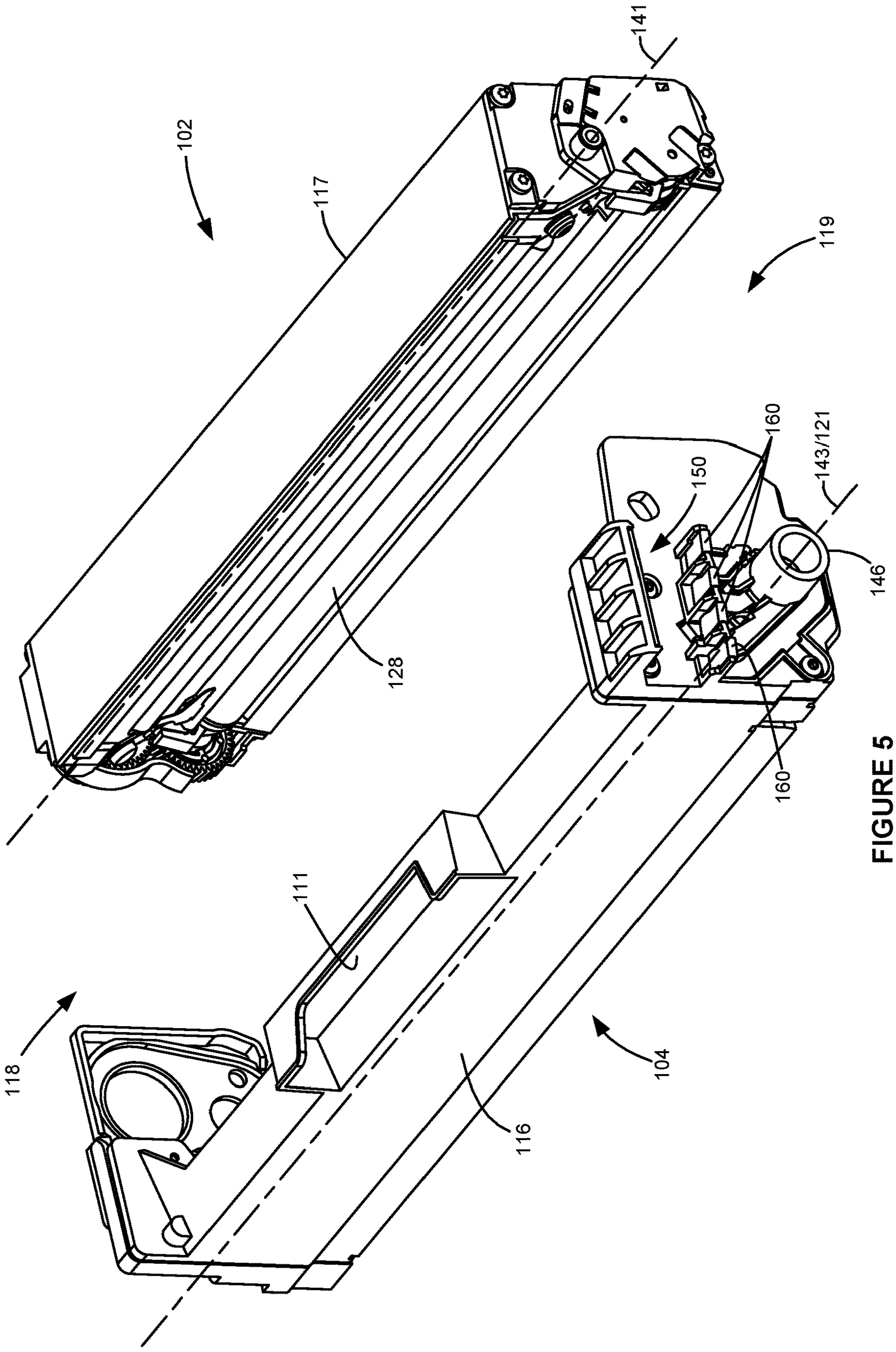
FIG. 5 is an exploded view of the toner cartridge shown in FIGS. 3 and 4 showing a developer unit and a photoconductor unit of the toner cartridge according to one example embodiment.

FIGS. 3-5 show the exterior of toner cartridge 100 according to one example embodiment. As shown, in this embodiment, developer unit 102 is positioned at side 117 of housing 110 and photoconductor unit 104 is positioned at side 116 of housing 110. FIG. 5 shows developer unit 102 separated from photoconductor unit 104 with developer roll 128 exposed on developer unit 102 for mating with photoconductive drum 120. In the example embodiment illustrated, toner cartridge 100 includes a handle 111 positioned along side 116 and/or top 114 of housing 110 to assist the user with handling toner cartridge 100.

In the example embodiment illustrated, a pair of drive couplers 140, 142 are exposed on an outer portion of housing 110 in position to receive rotational force from a corresponding drive system in image forming device 22 when toner cartridge 100 is installed in image forming device 22 to drive rotatable components of developer unit 102 and photoconductive drum 120, respectively. The drive system in image forming device 22 includes one or more drive motors and a drive transmission from the drive motor(s) to a pair of drive couplers that mate with drive couplers 140, 142 of toner cartridge 100 when toner cartridge 100 is installed in image forming device 22. In the example embodiment illustrated, drive couplers 140, 142 are each exposed on end 118 of housing 110. Each drive coupler 140, 142 includes a rotational axis 141, 143. Drive coupler 140 is operatively connected (either directly or indirectly through one or more intermediate gears) to rotatable components of developer unit 120 including, for example, developer roll 128, toner adder roll 130 and toner agitator 134, to rotate developer roll 128, toner adder roll 130 and toner agitator 134 upon receiving rotational force from the corresponding drive system in image forming device 22. Drive coupler 142 is operatively connected (either directly as in the embodiment illustrated or indirectly through one or more intermediate gears) to photoconductive drum 120 to rotate photoconductive drum 120 upon receiving rotational force from the corresponding drive system in image forming device 22. In some embodiments, charge roll 122 is driven by friction contact between the surfaces of charge roll 122 and photoconductive drum 120. In other embodiments, charge roll 122 is connected to drive coupler 142 by one or more gears.

In the example embodiment illustrated, a boss 146 protrudes outward in a cantilevered manner away from end 119, at and along a rotational axis 121 of photoconductive drum 120. Boss 146 supports an axial end of photoconductive drum 120 and aids in positioning toner cartridge 100 in image forming device 22.

Figure 6:
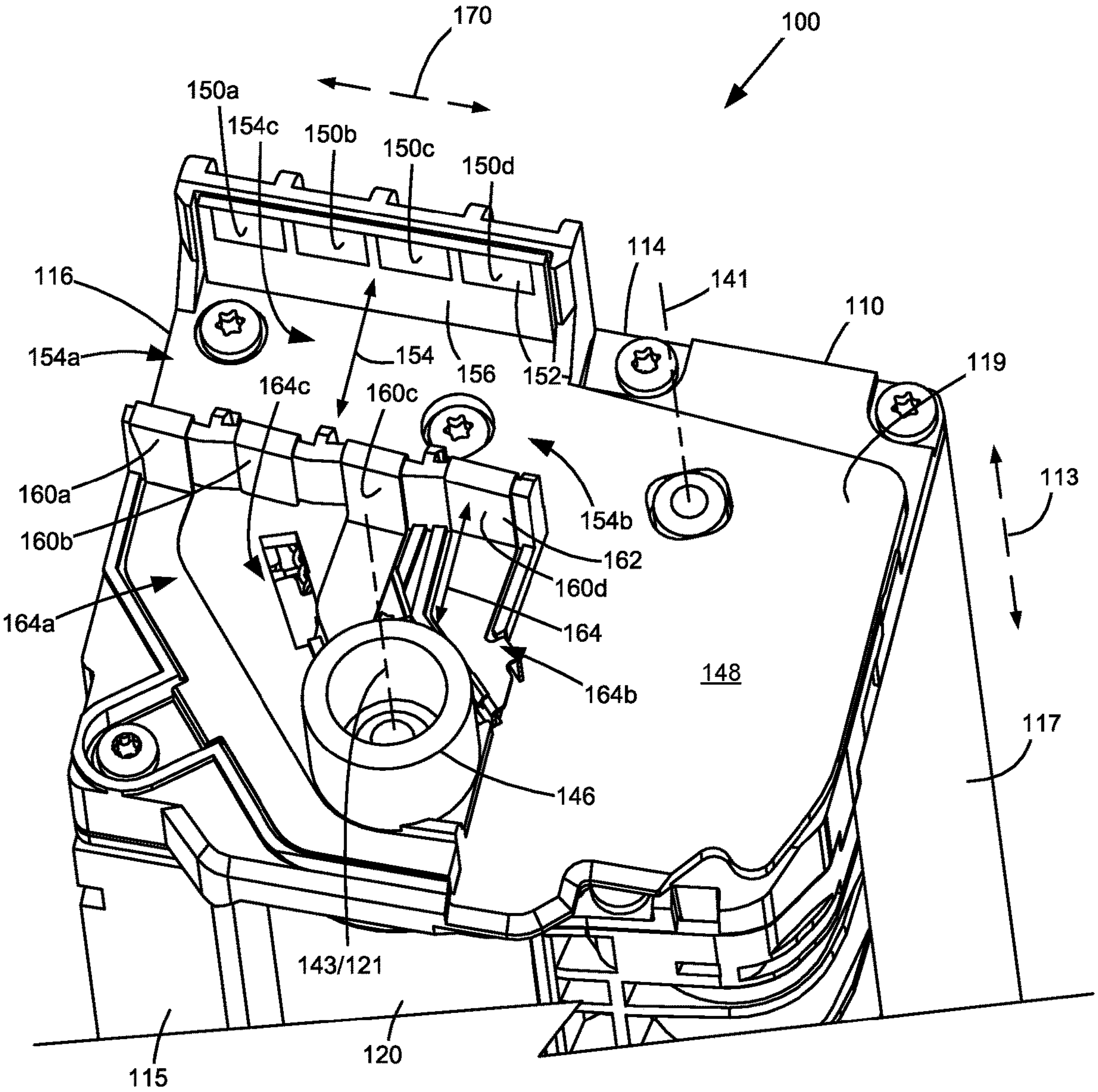
FIG. 6 is a perspective view of the toner cartridge shown in FIGS. 3-5 showing electrical contacts of the toner cartridge according to one example embodiment.

With reference to FIGS. 3 and 6, toner cartridge 100 includes one or more electrical contacts 150 positioned on the outer surface of housing 110 and electrically connected to processing circuitry 44. Toner cartridge 100 also includes one or more electrical contacts 160 positioned on the outer surface of housing 110 and electrically connected to one or more imaging components of toner cartridge 100. Electrical contacts 150 and 160 are positioned to contact corresponding electrical contacts in image forming device 22 when toner cartridge 100 is installed in image forming device 22 in order to facilitate communications link 51 between processing circuitry 44 and controller 28 and electrical path 56 between the one or more imaging components of toner cartridge 100 and power supply 42.

In the example embodiment illustrated, electrical contacts 150, 160 are positioned on end 119 of housing 110. Electrical contacts 150 and 160 are unobstructed on end 119 of housing 110 permitting electrical contacts 150 and 160 to mate with corresponding electrical contacts in image forming device 22 upon installation of toner cartridge 100 into image forming device 22. In the example embodiment illustrated, electrical contacts 150 and 160 are each exposed and unobstructed from below (in a direction from bottom 115 to top 114 of housing 110) permitting the corresponding electrical contacts in image forming device 22 to contact electrical contacts 150 and 160 from below upon installation of toner cartridge 100 into image forming device 22. In this embodiment, at least a portion of each of electrical contacts 150 and 160 faces primarily downward, toward bottom 115 of housing 110 to facilitate contact from below by the corresponding electrical contacts in image forming device 22. In the example embodiment illustrated, electrical contacts 150 are positioned higher than electrical contacts 160, such as directly above electrical contacts 160 as shown. In this embodiment, electrical contacts 150 and 160 extend outward, away from end 119, along an axial dimension of photoconductive drum 120. In the example embodiment illustrated, electrical contacts 150 are positioned adjacent to the top 114 of housing 110, higher than rotational axes 141, 143 of drive couplers 140, 142 and higher than rotational axis 121 of photoconductive drum 120. In this embodiment, electrical contacts 160 are positioned approximately midway up end 119 of housing 110, higher than rotational axis 143 of drive coupler 142 and higher than rotational axis 121 of photoconductive drum 120, but lower than rotational axis 141 of drive coupler 140.

In the example embodiment illustrated, electrical contacts 150 and 160 are positioned adjacent to side 116 of housing 110. Electrical contacts 150 are aligned with electrical contacts 160 along a lateral dimension 170 of housing 100 that runs from side 116 to side 117, orthogonal to longitudinal dimension 113, such that electrical contacts 150 overlap with electrical contacts 160 along lateral dimension 170. A rear end 152, 162 of each set of electrical contacts 150, 160 is aligned with boss 146 and with rotational axis 121 of photoconductive drum 120 such that rear ends 152, 162 of electrical contacts 150, 160 overlap with boss 146 and rotational axis 121 of photoconductive drum 120 along lateral dimension 170. Electrical contacts 150, 160 are spaced toward side 116 of housing 110 from rotational axis 141 of drive coupler 140, which is positioned closer to side 117 of housing 110 than to side 116 of housing 110 in the embodiment illustrated.

Electrical contacts 150 and 160 and an outer surface 148 of end 119 of housing 110 combine to form a pocket 154 below electrical contacts 150 and above electrical contacts 160. Pocket 154 receives the corresponding electrical contacts in image forming device 22 that mate with electrical contacts 150 when toner cartridge 100 is installed in image forming device 22. Pocket 154 is open at a front end 154*a*, a rear end 154*b* and an outer axial end 154*c* of pocket 154 so that the corresponding electrical contacts in image forming device 22 that mate with electrical contacts 150 are free to pass along lateral dimension 170 between electrical contacts 150 and 160 as toner cartridge 100 is installed in image forming device 22.

Similarly, electrical contacts 160, boss 146 and outer surface 148 of end 119 of housing 110 combine to form a pocket 164 below electrical contacts 160 and above boss 146. Pocket 164 receives the corresponding electrical contacts in image forming device 22 that mate with electrical contacts 160 when toner cartridge 100 is installed in image forming device 22. Pocket 164 is open at a front end 164*a*, a rear end 164*b* and an outer axial end 164*c* of pocket 164 so that the corresponding electrical contacts in image forming device 22 that mate with electrical contacts 160 are free to pass along lateral dimension 170 between electrical contacts 160 and boss 146 as toner cartridge 100 is installed in image forming device 22.

In the example embodiment illustrated, electrical contacts 150 are positioned on a printed circuit board 156 that is mounted to housing 110 and that includes processing circuitry 44 thereon. In another embodiment, processing circuitry 44 is positioned elsewhere on housing 110 and is electrically connected to electrical contacts 150, for example, by suitable traces or cabling. In the example embodiment illustrated, electrical contacts 150 include four electrical contacts 150*a*, 150*b*, 150*c*, 150*d* spaced from each other along lateral dimension 170. However, electrical contacts 150 may include any suitable number of contacts depending on the number of contacts needed for processing circuitry 44. In one embodiment, electrical contact 150*a* is electrically connected to a voltage supply line of processing circuitry 44; electrical contact 150*b* is electrically connected to a data line of processing circuitry 44; electrical contact 150*c* is electrically connected to a ground line of processing circuitry 44; and electrical contact 150*d* is electrically connected to a clock line of processing circuitry 44. However, electrical contacts 150 may be arranged in other manners as desired.

In the example embodiment illustrated, electrical contacts 160 include four electrical contacts 160*a*, 160*b*, 160*c*, 160*d* spaced from each other along lateral dimension 170. However, electrical contacts 160 may include any suitable number of contacts depending on the number of imaging components of toner cartridge 100 requiring a discrete connection to power supply 42. In one embodiment, electrical contact 160*a* is electrically connected to toner adder roll 130; electrical contact 160*b* is electrically connected to charge roll 122; electrical contact 160*c* is electrically connected to photoconductive drum 120; and electrical contact 160*d* is electrically connected to developer roll 128. However, electrical contacts 160 may be arranged in other manners as desired.

Figure 7:
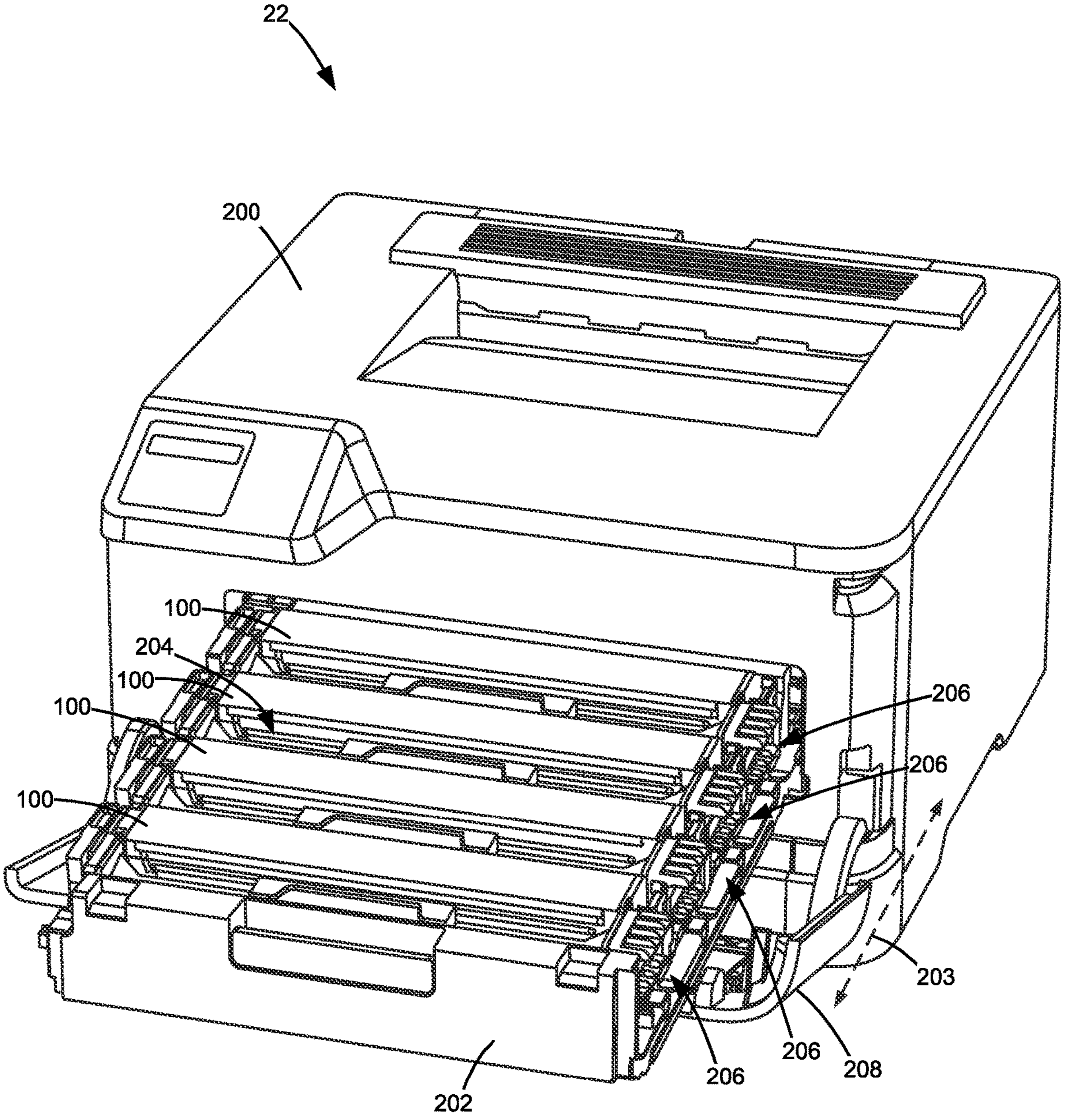
FIG. 7 is a perspective view of the image forming device showing a drawer holding four toner cartridges according to one example embodiment.

FIG. 7 shows image forming device 22 according to one example embodiment. In this embodiment, image forming device 22 includes a housing 200 and a drawer 202 mounted on housing 200. Drawer 202 is slidable into and out of housing 200 along a sliding direction 203 between an open position (shown in FIG. 7) and a closed position. Drawer 202 includes a basket 204 configured to receive and support four toner cartridges 100 in image forming device 22. In this embodiment, each of the four toner cartridges 100 is substantially the same except for the color of the toner contained therein. Toner cartridges 100 are vertically insertable into and removable from four corresponding positioning slots 206 of basket 204. Positioning slots 206 of basket 204 retain and locate toner cartridges 100 in their operating positions within image forming device 22 when toner cartridges 100 are installed in basket 204 and drawer 202 is closed. In the embodiment illustrated, drawer 202 is accessible through an access door 208 of image forming device 22.

FIGS. 8A-8D are sequential views illustrating the positions of electrical contacts 150 and 160 of four toner cartridges 100 in basket 204 relative to corresponding electrical contacts 210, 220 of image forming device 22 as drawer 202 moves from an open position to a closed position and access door 208 moves from an open position to a closed position. For purposes of clarity, FIGS. 8A-8D show a schematic outline of housing 200 and access door 208 as well as an indication of the positions of electrical contacts 210, 220 within housing 200, but omit other features of image forming device 22.

Figure 8A:
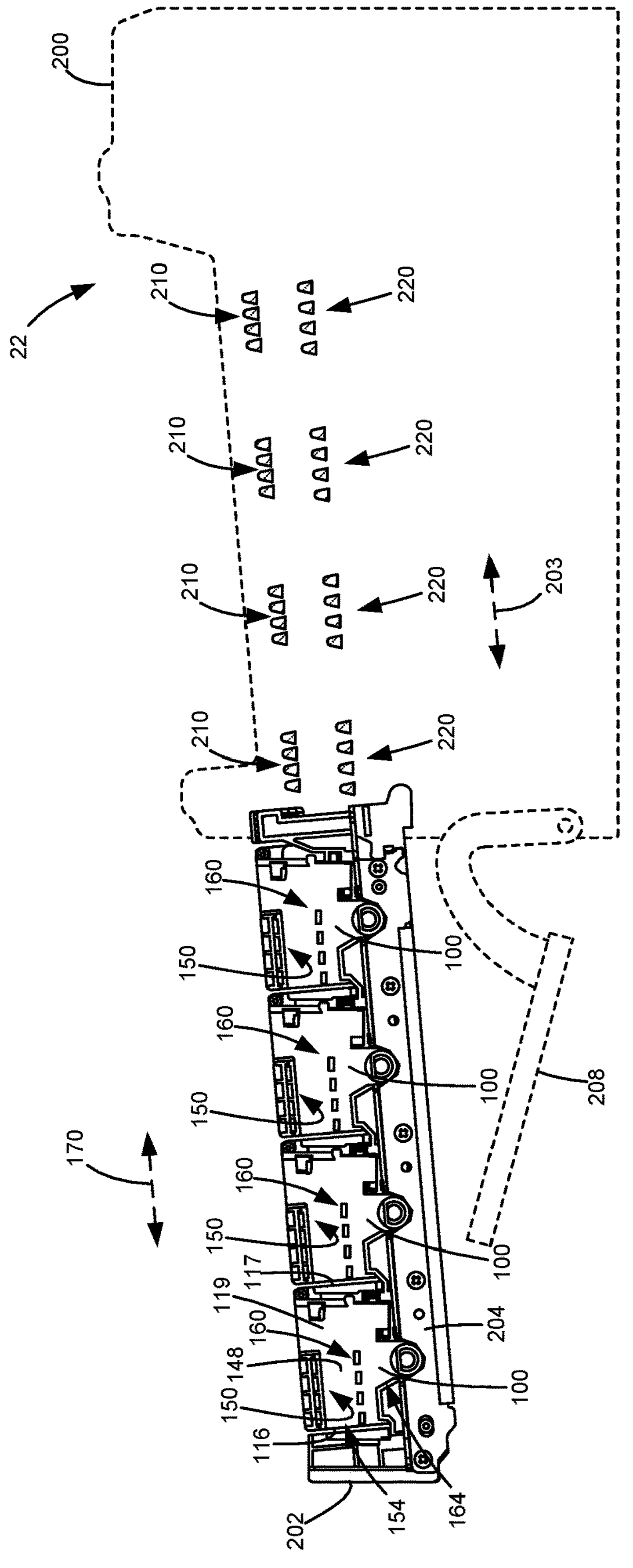
FIGS. 8A-8D are sequential side elevation views illustrating the positions of the electrical contacts of the four toner cartridges relative to corresponding electrical contacts of the image forming device as the drawer moves from an open position to a closed position and an access door to the image forming device moves from an open position to a closed position according to one example embodiment.

FIG. 8A shows access door 208 of housing 200 in an open position with drawer 202 in a fully open position with all four toner cartridges 100 exposed in basket 204 outside of housing 200 allowing a user to replace one or more of the toner cartridges 100.

Figure 8B:
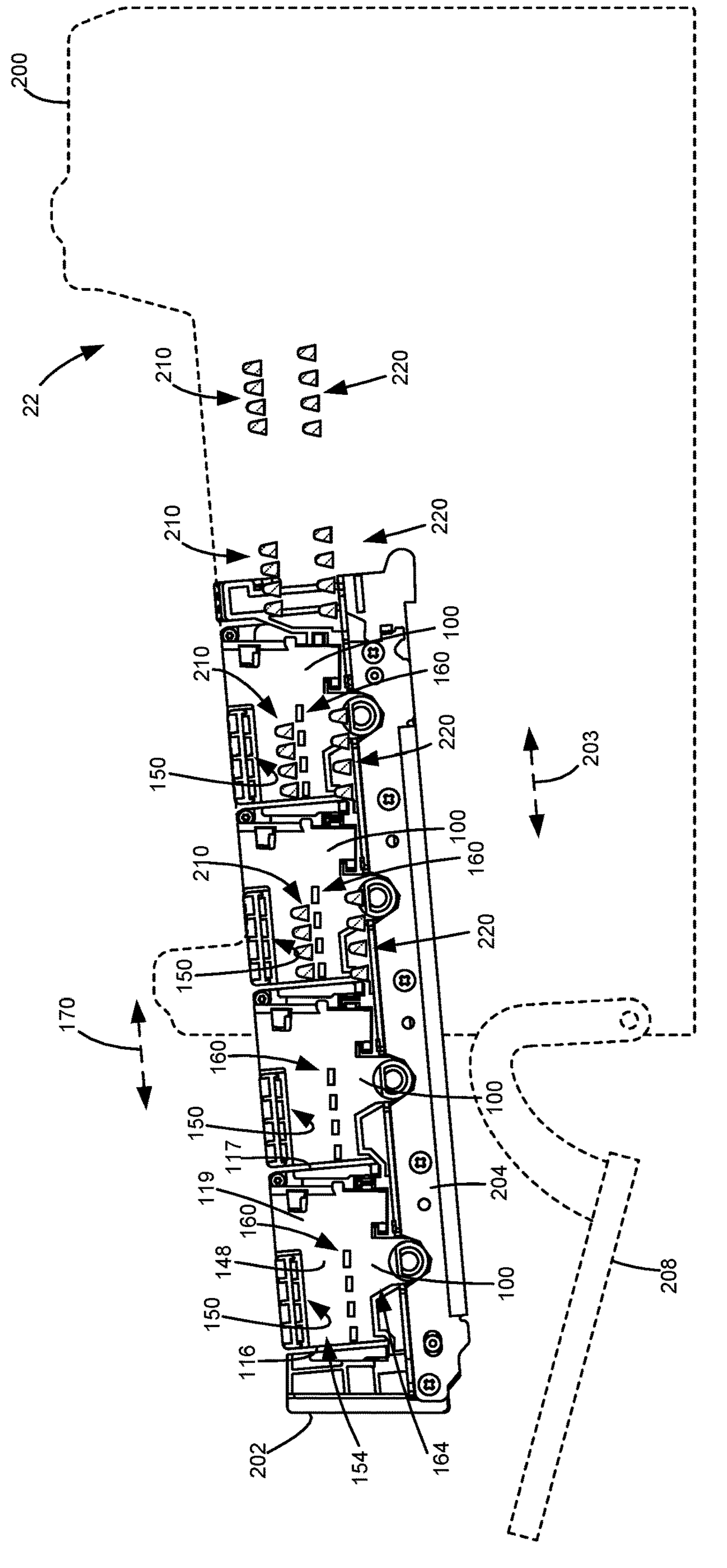

FIG. 8B shows drawer 202 slid halfway into housing 200. As drawer 202 slides closed, toner cartridges 100 move into housing 200 of image forming device 22 with side 117 of each housing 110 leading and side 116 of each housing 110 trailing. As drawer 202 moves along sliding direction 203, electrical contacts 210 pass along lateral dimensions 170 of toner cartridges 100 through pocket 154 of each successive toner cartridge 100, between electrical contacts 150 and 160 and spaced from outer surface 148 of longitudinal end 119 of each toner cartridge 100. Similarly, as drawer 202 moves along sliding direction 203, electrical contacts 220 pass along lateral dimensions 170 of toner cartridges 100 through pocket 164 of each successive toner cartridge 100, between electrical contacts 160 and boss 146 and spaced from outer surface 148 of longitudinal end 119 of each toner cartridge 100.

Figure 8C:
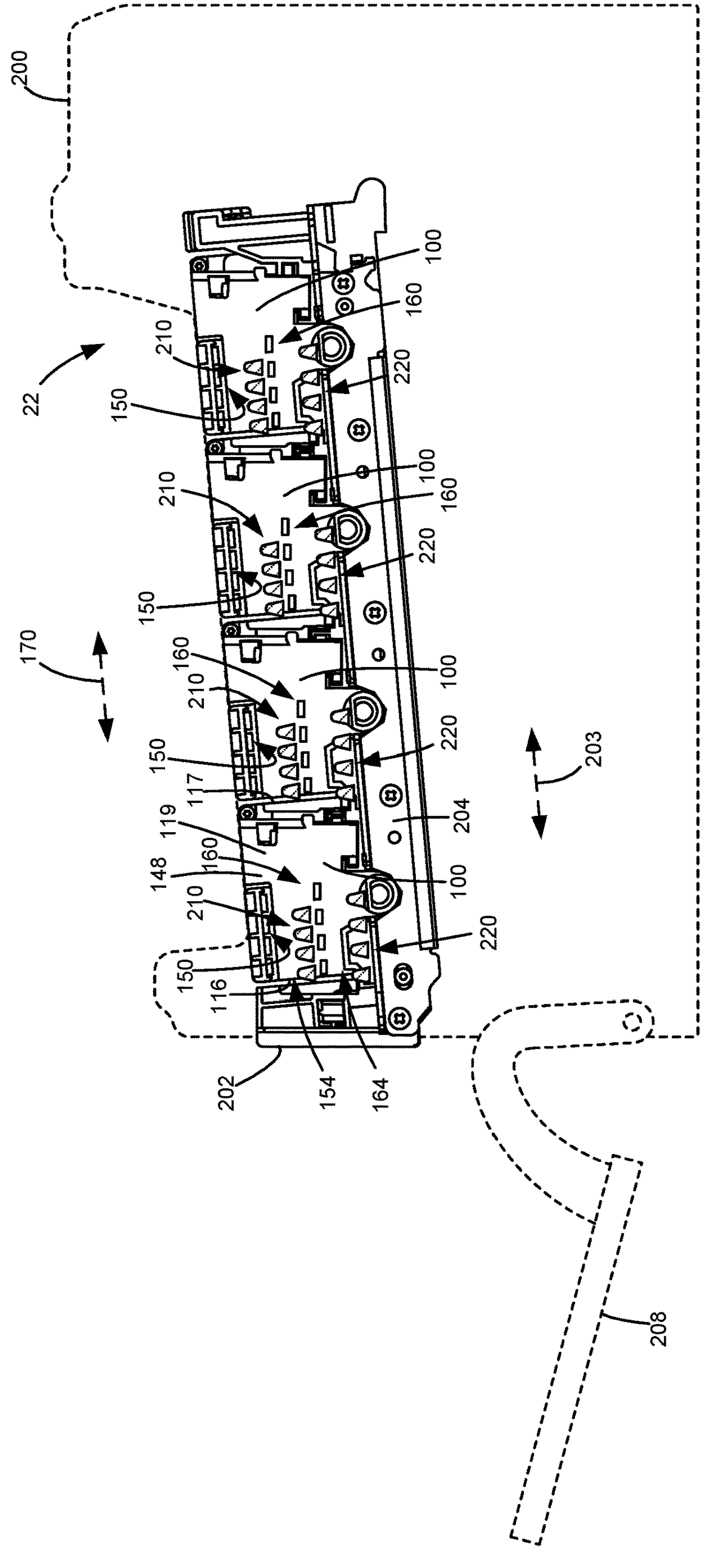

FIG. 8C shows drawer 202 slid completely into housing 200 in a closed position of drawer 202 with access door 208 in the open position. In the example embodiment illustrated, when drawer 202 is completely closed and access door 208 is in the open position, electrical contacts 210 are positioned in pockets 154 of toner cartridges 100, in alignment with their corresponding electrical contacts 150 on toner cartridges 100 along lateral dimensions 170 of toner cartridges 100 and just below the corresponding electrical contacts 150. Similarly, when drawer 202 is completely closed and access door 208 is in the open position, electrical contacts 220 are positioned in pockets 164 of toner cartridges 100, in alignment with their corresponding electrical contacts 160 on toner cartridges 100 along lateral dimensions 170 of toner cartridges 100 and just below the corresponding electrical contacts 160.

Figure 8D:
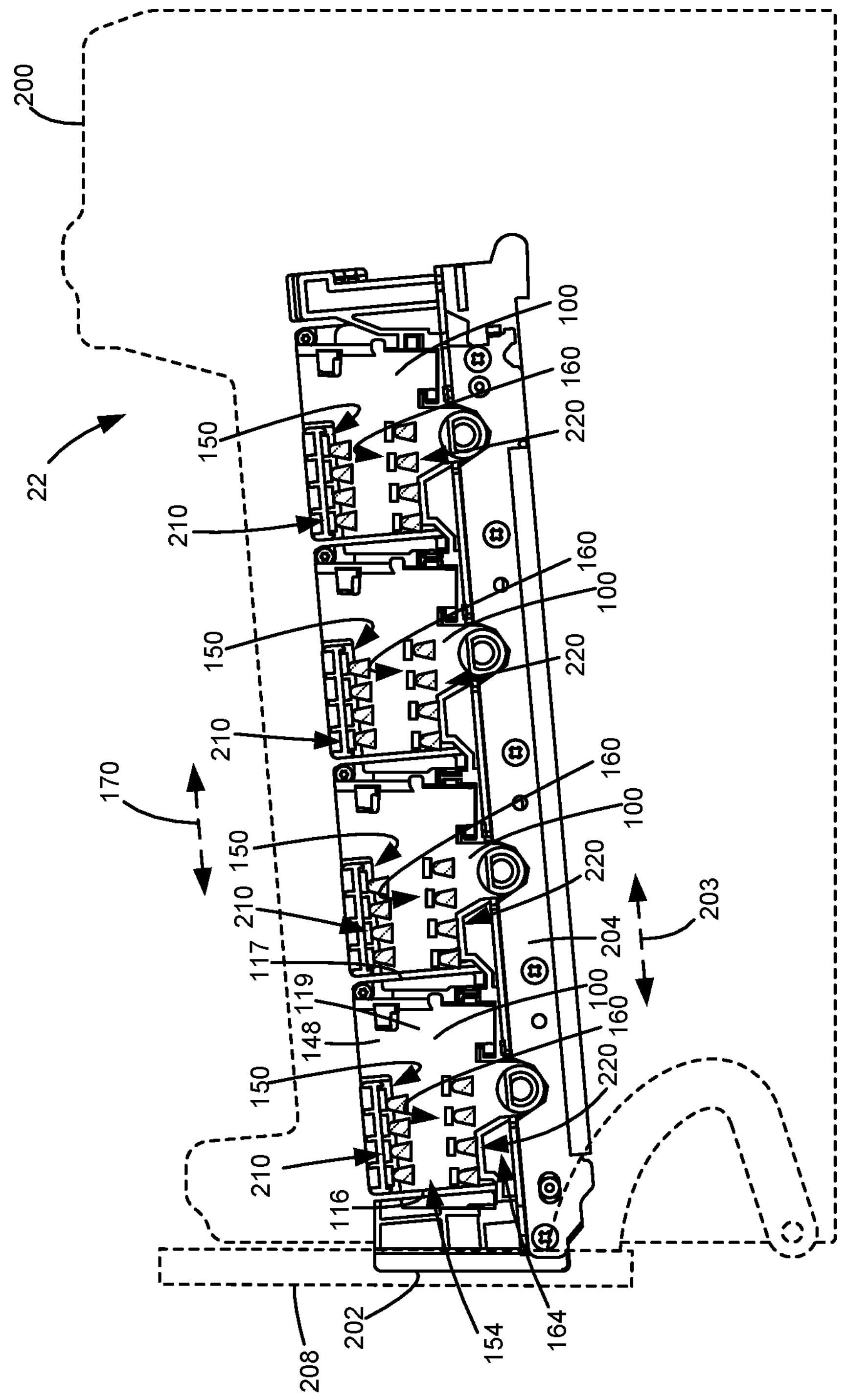

FIG. 8D shows drawer 202 and access door 208 in their respective closed positions. In the example embodiment illustrated, when access door 208 of image forming device 22 closes, a linkage in image forming device 22 operatively connected to access door 208 lowers drawer 202 causing toner cartridges 100 to move vertically downward to their final operating positions in image forming device 22. The downward movement of toner cartridges 100 lowers electrical contacts 150, 160 of toner cartridge 100 into contact with corresponding electrical contacts 210, 220 in image forming device 22 as shown in FIG. 8D. Contact between electrical contacts 150, 160 of toner cartridge 100 and corresponding electrical contacts 210, 220 in image forming device 22 facilitates communications link 51 between processing circuitry 44 and controller 28 and electrical path 56 between the one or more imaging components of toner cartridge(s) 100 and power supply 42.

Figure 9:
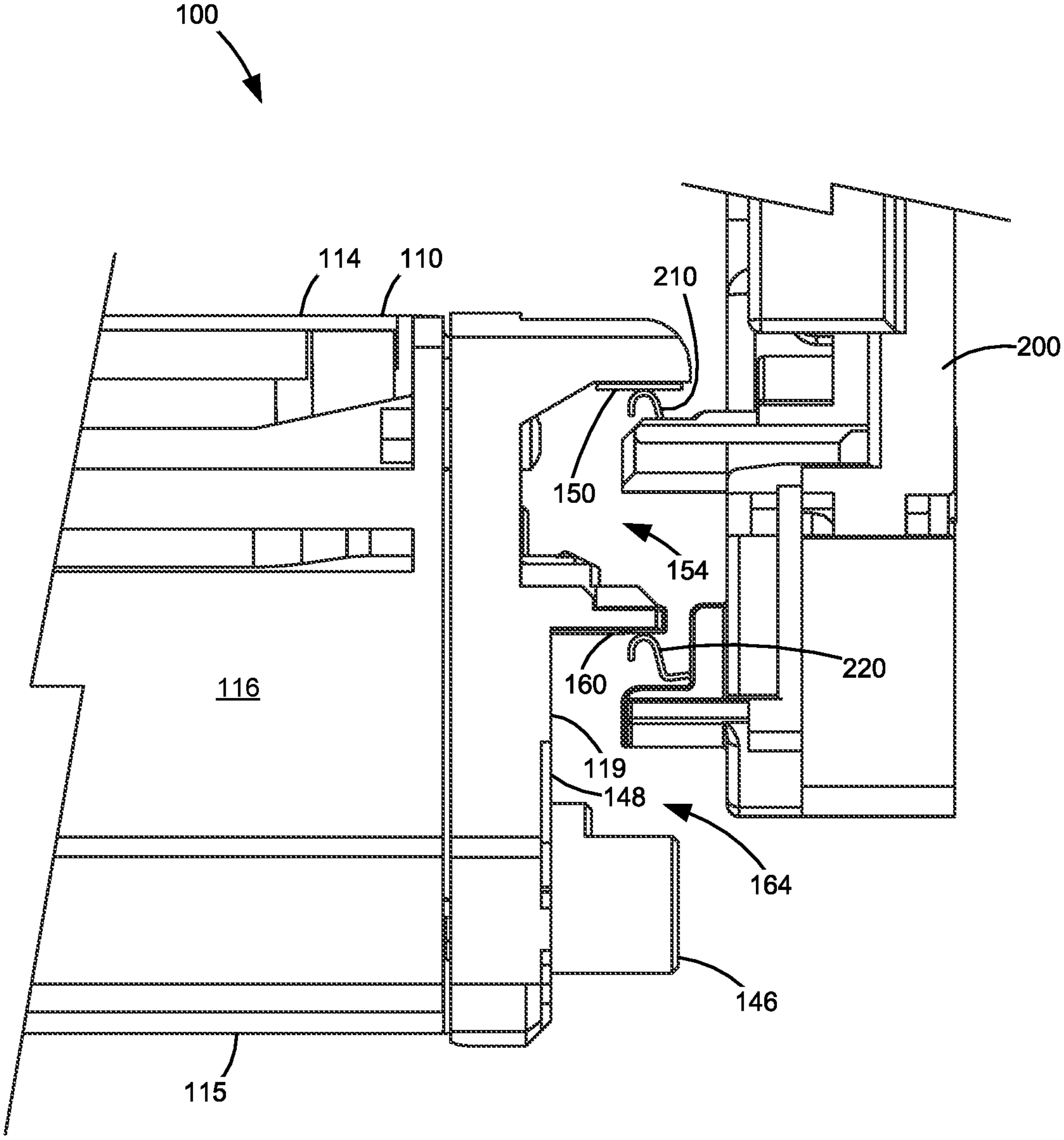
FIG. 9 is a front elevation view showing the electrical contacts of the toner cartridge in contact with corresponding electrical contacts in the image forming device according to one example embodiment.

As shown in FIG. 9, in one embodiment, the lowering of toner cartridge 100 to its final operating position in image forming device 22 results in an interference contact between electrical contacts 150, 160 of toner cartridge 100 and corresponding electrical contacts 210, 220 in image forming device 22 causing electrical contacts 210, 220 in image forming device 22 to deflect downward from their nominal positions. The interference contact between electrical contacts 150, 160 of toner cartridge 100 and corresponding electrical contacts 210, 220 in image forming device 22 helps ensure that consistent, reliable contact is maintained between electrical contacts 150, 160 and electrical contacts 210, 220.

Figure 10:
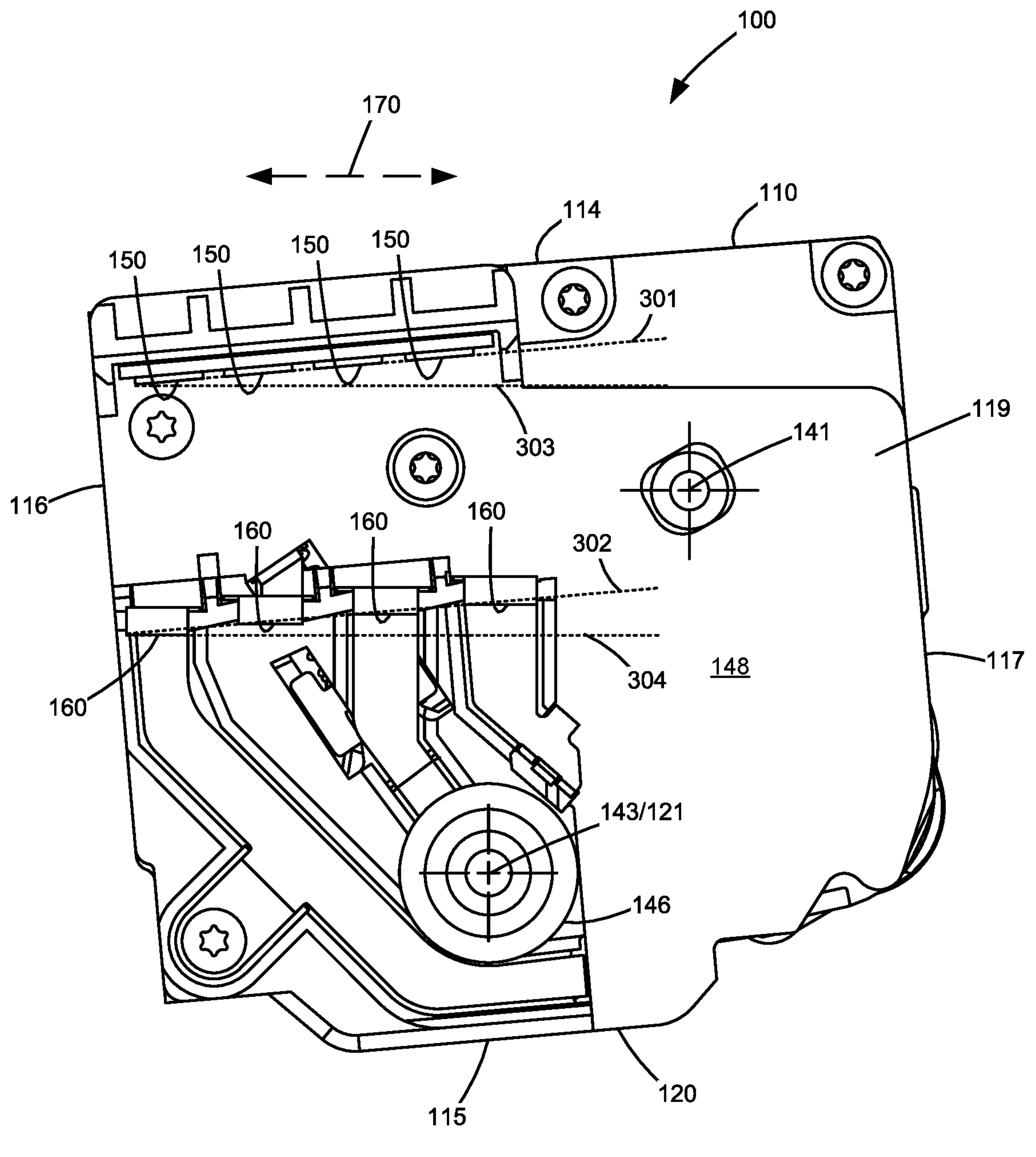
FIG. 10 is a side elevation view of the toner cartridge showing the electrical contacts of the toner cartridge according to one example embodiment.

FIG. 10 shows toner cartridge 100 in the orientation of its final position installed in basket 204. In the example embodiment illustrated, each set of electrical contacts 150, 160 is angled upward from side 116 to side 117 relative to horizontal along lateral dimension 170 as illustrated by lines 301 and 302 showing the positions of electrical contacts 150 and 160 relative to horizontal lines 303, 304. For example, in some embodiments, electrical contacts 150, 160 may be angled upward from side 116 to side 117 relative to horizontal by at least 2 degrees and by no greater than 10 degrees, including by about 5 degrees as illustrated in FIG. 10. In some embodiments, each individual electrical contact 150, 160 is angled upward from side 116 to side 117 relative to horizontal such that each set of electrical contacts 150, 160 angles continuously upward (such as in the manner illustrated for electrical contacts 150). In other embodiments, each individual electrical contact 150, 160 is oriented horizontally with each set of electrical contacts 150, 160 arranged in a stair-stepped arrangement to achieve the upward angle of each set of electrical contacts 150, 160 (such as in the manner illustrated for electrical contacts 160). The upward angle of electrical contacts 150, 160 from side 116 to side 117 helps ensure that the electrical contacts 150, 160 of each toner cartridge 100 do not crash into any of the electrical contacts 210, 220 that precede the electrical contacts 210, 220 that correspond with that toner cartridge 100 as each toner cartridge 100 advances into housing 200 of image forming device 22.

Accordingly, the positioning of electrical contacts 150, 160 of toner cartridge 100 according to the various embodiments described permits a user-friendly installation of the toner cartridge into the image forming device while also providing precise location of the electrical contacts of the toner cartridge relative to the corresponding electrical contacts in the image forming device in order to achieve and maintain a consistent, reliable electrical connection between the toner cartridge and the image forming device.

Although the example embodiments illustrated include electrical contacts 150, 160 fixedly positioned on housing 110, in other embodiments, electrical contacts 150, 160 may be movable between an operating position (such as the positions illustrated) for mating with corresponding electrical contacts 210, 220 and another position (such as a retracted position). For example, movement of electrical contacts 150, 160 may be actuated by a linkage triggered by the opening and closing of access door 208 of image forming device 22.

Further, although the example embodiment discussed above includes a single replaceable unit in the form of toner cartridge 100 for each toner color, it will be appreciated that the replaceable unit(s) of the image forming device may employ any suitable configuration as desired. For example, in one embodiment, the main toner supply for the image forming device is provided in a first replaceable unit and the developer unit and photoconductor unit are provided in a second replaceable unit. In another embodiment, the main toner supply for the image forming device and the developer unit are provided in a first replaceable unit and the photoconductor unit is provided in a second replaceable unit. Other configurations may be used as desired.

Further, it will be appreciated that the architecture and shape of toner cartridge 100 illustrated in FIGS. 2-5 is merely intended to serve as an example. Those skilled in the art understand that toner cartridges, and other toner containers, may take many different shapes and configurations.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner cartridge for use in an electrophotographic image forming device, comprising:

a housing having a top, a bottom, a first side and a second side positioned between a first longitudinal end and a second longitudinal end of the housing, the housing has a reservoir for holding toner;

a first set of electrical contacts and a second set of electrical contacts on the first longitudinal end of the housing for contacting a first set of corresponding electrical contacts in the image forming device and a second set of corresponding electrical contacts in the image forming device when the toner cartridge is installed in the image forming device, the first set of electrical contacts of the toner cartridge are spaced from each other along a lateral dimension of the housing that runs from the first side to the second side, the second set of electrical contacts of the toner cartridge are spaced from each other along the lateral dimension of the housing, the first set of electrical contacts of the toner cartridge is positioned higher than the second set of electrical contacts of the toner cartridge; and a first pocket positioned directly below the first set of electrical contacts of the toner cartridge and a second pocket positioned directly below the second set of electrical contacts of the toner cartridge permitting additional electrical contacts in the image forming device to pass directly below the first set of electrical contacts of the toner cartridge and directly below the second set of electrical contacts of the toner cartridge along the lateral dimension of the housing during installation of the toner cartridge into the image forming device.

2. The toner cartridge of claim 1, further comprising a first drive coupler and a second drive coupler on the second longitudinal end of the housing for mating with a first corresponding drive coupler in the image forming device and a second corresponding drive coupler in the image forming device for receiving rotational motion from the first corresponding drive coupler in the image forming device and the second corresponding drive coupler in the image forming device when the toner cartridge is installed in the image forming device, the first drive coupler of the toner cartridge has a first rotational axis and the second drive coupler of the toner cartridge has a second rotational axis, the first set of electrical contacts of the toner cartridge and the second set of electrical contacts of the toner cartridge are positioned higher than the first rotational axis, the first set of electrical contacts of the toner cartridge is positioned higher than the second rotational axis and the second set of electrical contacts of the toner cartridge is positioned lower than the second rotational axis.

3. The toner cartridge of claim 2, wherein the first set of electrical contacts of the toner cartridge and the second set of electrical contacts of the toner cartridge are positioned closer to the first side of the housing than the second rotational axis is to the first side of the housing, and the second rotational axis is positioned closer to the second side of the housing than to the first side of the housing.

4. The toner cartridge of claim 1, wherein the first set of electrical contacts of the toner cartridge and the second set of electrical contacts of the toner cartridge face primarily downward facilitating the first set of corresponding electrical contacts in the image forming device to contact the first set of electrical contacts of the toner cartridge from below and the second set of corresponding electrical contacts in the image forming device to contact the second set of electrical contacts of the toner cartridge from below when the toner cartridge is installed in the image forming device.

5. The toner cartridge of claim 1, wherein the first set of electrical contacts of the toner cartridge and the second set of electrical contacts of the toner cartridge extend outward away from the first longitudinal end of the housing along a longitudinal dimension of the housing.

6. The toner cartridge of claim 1, wherein the first set of electrical contacts of the toner cartridge is positioned directly above the second set of electrical contacts of the toner cartridge.

7. The toner cartridge of claim 1, wherein the first set of electrical contacts of the toner cartridge overlaps with the second set of electrical contacts of the toner cartridge along the lateral dimension of the housing.

8. The toner cartridge of claim 1, wherein the first set of electrical contacts of the toner cartridge is positioned adjacent to the top of the housing.

9. The toner cartridge of claim 1, wherein the first set of electrical contacts of the toner cartridge and the second set of electrical contacts of the toner cartridge are unobstructed from below permitting the first set of corresponding electrical contacts in the image forming device to contact the first set of electrical contacts of the toner cartridge from below and the second set of corresponding electrical contacts in the image forming device to contact the second set of electrical contacts of the toner cartridge from below when the toner cartridge is installed in the image forming device.

10. A toner cartridge, comprising:

a housing having a top, a bottom, a first side and a second side positioned between a first longitudinal end and a second longitudinal end of the housing, the housing has a reservoir for holding toner;

a first electrical contact and a second electrical contact on the first longitudinal end of the housing for contacting a first corresponding electrical contact in an image forming device and a second corresponding electrical contact in the image forming device when the toner cartridge is installed in the image forming device, the first electrical contact of the toner cartridge is positioned higher than the second electrical contact of the toner cartridge; and a first drive coupler and a second drive coupler on the second longitudinal end of the housing for mating with a first corresponding drive coupler in the image forming device and a second corresponding drive coupler in the image forming device for receiving rotational motion from the first corresponding drive coupler in the image forming device and the second corresponding drive coupler in the image forming device when the toner cartridge is installed in the image forming device, the first drive coupler of the toner cartridge has a first rotational axis and the second drive coupler of the toner cartridge has a second rotational axis, wherein the first electrical contact of the toner cartridge and the second electrical contact of the toner cartridge are positioned higher than the first rotational axis, the first electrical contact of the toner cartridge is positioned higher than the second rotational axis and the second electrical contact of the toner cartridge is positioned lower than the second rotational axis, wherein the first electrical contact of the toner cartridge and the second electrical contact of the toner cartridge are positioned closer to the first side of the housing than the second rotational axis is to the first side of the housing and the second rotational axis is positioned closer to the second side of the housing than to the first side of the housing.

11. The toner cartridge of claim 10, wherein the first electrical contact of the toner cartridge and the second electrical contact of the toner cartridge are unobstructed from below permitting the first corresponding electrical contact in the image forming device to contact the first electrical contact of the toner cartridge from below and the second corresponding electrical contact in the image forming device to contact the second electrical contact of the toner cartridge from below when the toner cartridge is installed in the image forming device.

12. The toner cartridge of claim 10, wherein the first electrical contact of the toner cartridge and the second electrical contact of the toner cartridge face primarily downward facilitating the first corresponding electrical contact in the image forming device to contact the first electrical contact of the toner cartridge from below and the second corresponding electrical contact in the image forming device to contact the second electrical contact of the toner cartridge from below when the toner cartridge is installed in the image forming device.

13. The toner cartridge of claim 10, wherein the first electrical contact of the toner cartridge and the second electrical contact of the toner cartridge extend outward away from the first longitudinal end of the housing along a longitudinal dimension of the housing.

14. The toner cartridge of claim 10, wherein the first electrical contact of the toner cartridge includes a first set of electrical contacts of the toner cartridge and the second electrical contact of the toner cartridge includes a second set of electrical contacts of the toner cartridge, the first set of electrical contacts of the toner cartridge are spaced from each other along a lateral dimension of the housing that runs from the first side to the second side, the second set of electrical contacts of the toner cartridge are spaced from each other along the lateral dimension of the housing, the first set of electrical contacts of the toner cartridge are each electrically connected to processing circuitry positioned on the toner cartridge, the second set of electrical contacts of the toner cartridge are each electrically connected to a respective imaging component positioned on the toner cartridge.

15. The toner cartridge of claim 14, wherein the first set of electrical contacts of the toner cartridge is positioned directly above the second set of electrical contacts of the toner cartridge.

16. The toner cartridge of claim 14, wherein the first set of electrical contacts of the toner cartridge overlaps with the second set of electrical contacts of the toner cartridge along the lateral dimension of the housing.

17. The toner cartridge of claim 10, wherein the first electrical contact of the toner cartridge is positioned adjacent to the top of the housing.

18. The toner cartridge of claim 10, further comprising a first pocket positioned directly below the first electrical contact of the toner cartridge and a second pocket positioned directly below the second electrical contact of the toner cartridge permitting additional electrical contacts in the image forming device to pass directly below the first electrical contact of the toner cartridge and directly below the second electrical contact of the toner cartridge along a lateral dimension of the housing that runs from the first side to the second side during installation of the toner cartridge into the image forming device.

* * * * *